United States Patent
Ritz et al.

(10) Patent No.: US 12,234,885 B2
(45) Date of Patent: Feb. 25, 2025

(54) OPTIMIZED CHAIN LENGTH CONTROL

(71) Applicant: IWIS MOTORSYSTEME GMBH & CO. KG, Munich (DE)

(72) Inventors: Andreas Ritz, Munich (DE); Bahram Khani, Munich (DE); Andreas Urbanek, Munich (DE)

(73) Assignee: IWIS MOTORSYSTEME GMBH & CO. KG, Munich (DE)

( * ) Notice: Subject to any disclaimer, the term of this patent is extended or adjusted under 35 U.S.C. 154(b) by 243 days.

(21) Appl. No.: 17/615,816

(22) PCT Filed: Jun. 4, 2020

(86) PCT No.: PCT/EP2020/065476
§ 371 (c)(1),
(2) Date: Dec. 1, 2021

(87) PCT Pub. No.: WO2020/245266
PCT Pub. Date: Dec. 10, 2020

(65) Prior Publication Data
US 2022/0333669 A1    Oct. 20, 2022

(30) Foreign Application Priority Data
Jun. 4, 2019 (EP) .................... 19178204

(51) Int. Cl.
*F16G 13/18* (2006.01)
*F16G 13/06* (2006.01)

(52) U.S. Cl.
CPC ............ *F16G 13/18* (2013.01); *F16G 13/06* (2013.01)

(58) Field of Classification Search
CPC .................... F16G 13/18; F16G 13/16
See application file for complete search history.

(56) References Cited

U.S. PATENT DOCUMENTS 2,600,174 A * 6/1952 Sheehan .............. B65G 17/385
474/227
3,107,777 A * 10/1963 Steorts, Jr. ........... B65G 17/385
198/852
(Continued)

FOREIGN PATENT DOCUMENTS

CN    201568526 U    9/2010
CN    103154567 A    6/2013
(Continued)

OTHER PUBLICATIONS

English translate (JP2009210006A), retrieved date Dec. 29, 2023.*

*Primary Examiner* — Mohammed S. Alawadi
(74) *Attorney, Agent, or Firm* — BakerHostetler

(57) ABSTRACT

A method for controlling the length of a sprocket chain of a chain type includes alternately arranged inner chain links and outer chain links that are connected together by, means of a chain joint, wherein each outer chain link has two outer plates, each of which comprises two openings and two pins that are pressed into the openings of the outer plates, each pin of the outer chain links having a joint region, which contacts the inner chain link and has a joint diameter, and two joining regions, which are pressed into the openings of the outer plates and have a joining diameter. The method prevents the disadvantages known from the prior art and in particular leads to a simple chain length control. For this purpose, the method has the following steps: providing a pin set comprising a plurality of pins, wherein at least two of the pins of the pin set have different joint diameters in the joint regions; and for at least one of the pins of the pin set; the joint diameter of the joint region differs from the joining diameter of the joining regions; ascertaining the pin joint region diameter required for a specified chain length; selecting the pin with the ascertained joint region diameter from the pin set; pressing the joining regions of the pin into the (Continued)

openings in the outer plates; and completing the sprocket chain. The use of a pin in such a method and to a pin set for such a method is also provided.

17 Claims, 1 Drawing Sheet

(56) References Cited

U.S. PATENT DOCUMENTS

| | | | | |
|---|---|---|---|---|
| 5,224,904 | A | * | 7/1993 | Ono .................... F16G 15/00 474/225 |
| 2006/0079365 | A1 | | 4/2006 | Fink et al. |

FOREIGN PATENT DOCUMENTS

| | | | | |
|---|---|---|---|---|
| CN | 106704487 | A | | 5/2017 |
| CN | 107939910 | A | | 4/2018 |
| CN | 207569146 | U | | 7/2018 |
| JP | 2009210006 | A | * | 9/2009 |
| WO | 03/091599 | A1 | | 11/2003 |

* cited by examiner

OPTIMIZED CHAIN LENGTH CONTROL

CROSS-REFERENCE TO RELATED APPLICATIONS

This application is a National Stage of International patent application PCT/EP2020/065476, filed on Jun. 4, 2020, which claims priority to foreign European patent application No. EP 19178204.4, filed on Jun. 4, 2019, the disclosures of which are incorporated by reference in their entirety.

The present invention relates to a method for chain length control of an sprocket chain of a chain type comprising alternately arranged inner chain links and outer chain links each connected to each other by means of a chain joint, each outer chain link having two outer link plates with two openings each and two pins pressed into the openings of the outer link plates, and the pins of the outer chain links each have a joint region in contact with the inner chain links and having a joint diameter and two joining regions pressed into the openings of the outer link plates and having a joining diameter.

BACKGROUND

The chain length of an sprocket chain results from the number of chain links and the average pitch of the chain. The average pitch ($\bar{p}$) of the chain results from the functional dimension of the outer chain links ($FM_{AKGL}$) and the functional dimension of the inner chain links ($FM_{AKGL}$) according to the following formula:

$$\bar{p} = \frac{1}{2}(FM_{AKGL} - FM_{IKGL})$$

In a fully assembled chain, the pins of the outer chain links are in contact with the sleeves of the inner chain links. Accordingly, the inner spacing of the pins in the outer chain link has a direct effect on the chain length. This inner spacing of the pins is the functional dimension of the outer chain link. The chain length control can usually be realized, among other things, by installing pins with different diameters. As described above, the pin diameter influences the functional dimension of the outer chain link, which has a direct effect on the chain length. However, since the pins usually have a cylindrical shape with a constant diameter over their entire length, a changed pin diameter also has a direct influence on the interference fit between the openings in the outer link plates and the pins. A larger diameter of the pin corresponds to a larger excess of the interference fit. The interference fit between the openings and the pins results in the outer link plates being deformed. The pins thereby displace the material of the outer link plates. The deformation of the outer link plates, however, is not uniform. More deformation occurs towards the ends of the outer link plates than towards the inside of the outer link plates. This in turn leads to a change in the functional dimension of the outer link plates. When the chain length is controlled by using cylindrical pins with different diameters, two superimposed effects therefore occur: on the one hand, the change in the functional dimension of the outer chain links due to a changed pin diameter, and on the other hand, the change in the functional dimension due to the deformation of the outer link plates when the pins are pressed into the openings in the outer link plates. This leads to a relatively complex adjustment of the chain length by changing the pin diameters of the cylindrical pins.

It is therefore the object of the present invention to provide a method for chain length control of a sprocket chain while avoiding the disadvantages known from the prior art and, in particular, contributing to simpler and more effective chain length control.

SUMMARY OF THE INVENTION

According to the invention, this object is solved in that the method comprises the following steps:
  providing a pin set including a plurality of pins, at least two of the pins from the pin set having different joint diameters of the joint regions and, for at least one of the pins from the pin set, the joint diameter of the joint region differing from the joining diameter of the joining regions,
  determining the joint diameter of the joint region of the pins required for a given chain length,
  selecting the pins with the determined joint diameter of the joint region from the pin set,
  pressing the joining regions of the selected pins into the openings in the outer link plates and
  finishing the chain.

A sprocket chain of a chain type refers to a sprocket chain with a specified number of chain links (inner chain links and outer chain links) and with a specified chain length.

By providing a pin set comprising a plurality of pins, and the pins of the pin set differing at least in part in their joint diameters, the pins of the pin set required for setting the predetermined chain length may be easily selected. The pins of the pin set may either come from a stock or be manufactured as required. Since the joining diameter of the joining regions of the pins is different from the joint diameter of the joint regions of the pins, machining the joint regions to set the joint diameter required for the required chain length does not change the joining regions of the pins. The deformations in the outer link plates generated when the joining regions of the pins are pressed into the openings in the outer link plates are therefore always constant and independent of the joint diameter in the joint region of the pins. This reduces the effect of the overlapping effects and allows simpler and more effective control of the chain length.

It is true that pins are already known from other areas of chain technology whose diameter in the joining regions differs from the diameter in the joint regions of the pins. However, these pins are not used for chain length control, but serve completely different purposes. For example, such pins are used to reduce the weight of very large chains. Pins whose geometry in the joint region differs from the geometry in the joining regions are also used in sidebow chains. In this case, this results in allowing the sidebow chains to adapt to arcuate curves.

According to a variant of the process, it may be provided that the joining regions of all pins of the pin set are of identical design and the joint diameter of the joint regions of the pins is set to the required diameter. Therefore, only one machining of the joint regions of the pins is required, and the joining regions are always designed identically, which simplifies the manufacture of the pins.

Preferably, the joint diameter of the joint regions of the pins may be greater than or equal to the joining diameter of the joining regions of the pins. Machining of the pins in the region of the joint, i.e. machining of the joint diameter, then has no influence on the joining diameter, so that it is ensured that the joining regions of all pins are identically formed. As a result, the deformations of the outer link plates occurring when the pins are pressed into the openings in the outer link plates are always the same, and may be taken into account correspondingly easily when setting the chain length.

In a further variant, it may be provided that each inner chain link includes two inner link plates arranged at a distance from one another transversely to the longitudinal direction of the chain and includes two sleeves, wherein each inner link plate has two openings, into which the sleeves are pressed and the sleeves hold the inner link plates at a distance from one another, and the pins of the outer chain links are guided with their joint regions through the sleeves of two adjacent inner chain links. The chains are therefore designed as sleeve chains. This simplifies the manufacture of the chain. However, it would also be conceivable to design the chain as a roller chain. In this case, a roller is rotatably arranged on each sleeve of the inner chain links.

According to a particularly preferred variant, there may be provided a joining chamfer at the joining regions of the pins. In the area of the joining chamfer the diameter of the joining regions of the pins changes and decreases starting from the joint region of the pins towards the respective pin ends. In such a configuration of the joining regions of the pins, the term "joining diameter" refers to the average diameter of the joining regions, i.e. half the sum of the maximum diameter and the minimum diameter. This joining chamfer simplifies the assembly of the pins in the outer link plates and enables easy centering of the pins in the openings of the outer link plates. In addition, any deformation of the outer link plates that occurs when the joining regions of the pins are pressed into the openings of the outer link plates is reduced. On the one hand, this leads to an increase in the fatigue strength of the chain. On the other hand, this further reduces the influence of pressing the pins into the openings of the outer link plates on the chain length.

Preferably, the length of the joining chamfer may be about 0.4 to 2.5 mm, preferably 0.6 to 1.5 mm. It has been shown that a length in the specified range allows good assembly and still ensures that a sufficiently high interference fit is achieved between pins and openings in the outer link plates and thus good fatigue strength of the chain.

A secure fit of the pins in the openings in the outer link plates with nevertheless low deformation and sufficient fatigue strength is achieved when the length of the joining chamfer corresponds approximately to the thickness of the outer link plates.

Ease of installation and a desirable increase in fatigue strength of the chains may be achieved if the chamfer angle of the joining chamfer is about 0.3° to 2°, preferably 0.5° to 1°. In the present case, the chamfer angle is the angle between the extension of the lateral surface of the cylindrical central part of the pin and the lateral surface of the joining chamfer.

Simple manufacture of the pins and simple assembly are made possible if the joining chamfer has a linear extension. The joining chamfer is then conical in shape, i.e. it has the form of a straight truncated circular cone.

However, it is also possible for the chamfer to be progressive or degressive. This improves the retention of the pins in the outer link plates of the chains.

Furthermore, the invention also relates to the use of a pin in the above-described method for chain length control of a sprocket chain of a chain type.

Also in this case, the object of the present invention is to provide a pin which, when used in a method for controlling the chain length of a sprocket chain of one chain type, avoids the disadvantages known from the prior art and, in particular, contributes to simpler and more effective chain length control.

For this purpose, in accordance with the invention it is provided that the pin has a central joint region with a joint diameter and joining regions with a joining diameter adjoining the joint region on both sides, the joining diameter of the joining regions of the pin remaining unchanged in the event of a change in the joint diameter of the joint region of the pin. By the corresponding design of the pin, the joint diameter of the joint region may be changed, i.e. adjusted to the diameter required for setting the predetermined chain length, without affecting the diameter of the joining regions. A change in the joint diameter of the pin for chain length control therefore does not lead to a change in the shape of the joining regions, in particular the joining chamfer, and thus also to no changes in the deformation behavior of the outer link plates when the pins are pressed into the openings in the outer link plates, which would additionally influence the chain length. The pin has the features described above with respect to the method. In particular, it may be provided that a joining chamfer is formed at the joining regions of the pins, wherein the length of the joining chamfer is about 0.4 to 2.5 mm, preferably 0.6 to 1.5 mm, and the length of the joining chamfer corresponds approximately to the thickness of the outer link plates. The chamfer angle of the joining chamfer of the pins is about 0, 3° to 2°, preferably 0.5° to 1°. The joining chamfer of the pins may extend linearly or also progressively or degressively.

The present invention also relates to a pin set for chain length control of a sprocket chain of a chain type, including a plurality of pins, each of the pins having a joint region with a joint diameter and two joining regions with a joining diameter adjoining the joint region on both sides. The set of pins is used in the method described above.

Again, the object of the present invention is to provide a pin set which, when used in a method for chain length control of a sprocket chain, avoids the disadvantages known from the prior art and, in particular, contributes to simpler and more effective chain length control.

According to the invention, this object is solved in that at least two of the pins of the pin set have different joint diameters and, for at least one of the pins, the joint diameter differs from the joining diameter. The pins required in each case for setting the specified chain length may then be selected from the pin set. Since the joint diameter differs from the joining diameter, machining the pins in the joint region does not result in a change in the joining regions. This avoids the different deformation of the outer link plates known from the prior art due to correspondingly differently designed joining regions of the pins, thus simplifying the adjustment of the chain length. The pins of the pin set may either come from stock, i.e. a stock of different pins with different joint diameters is kept in readiness, or may be manufactured as required.

Advantageously, it may be provided that the joining diameter of the joining regions of all pins of the pin set is identical and the joint diameters of the joint regions of the pins are larger than or equal to the joining diameter of the joining regions. It may also be provided that the outer diameter of the pin changes abruptly, i.e. decreases abruptly, at the transition from the joint region to the joining regions. The joining region may then have a cylindrical shape.

In a further variant, it may be provided that the pins of the pin set have a joining chamfer in their joining regions. As described above, a joining chamfer of this kind has a positive effect on the deformation of the outer link plates.

This makes it possible to achieve the compressive stress between outer link plates and pins required for secure fastening of the pins in the openings in the outer link plates. The outer link plates are therefore securely fastened to the pins without reducing the fatigue strength of the outer link plates. This joining chamfer may have the features described above.

BRIEF DESCRIPTION OF THE DRAWINGS

The invention is described in more detail below with reference to Figures. In the Figures.

DETAILED DESCRIPTION

Figure 1:
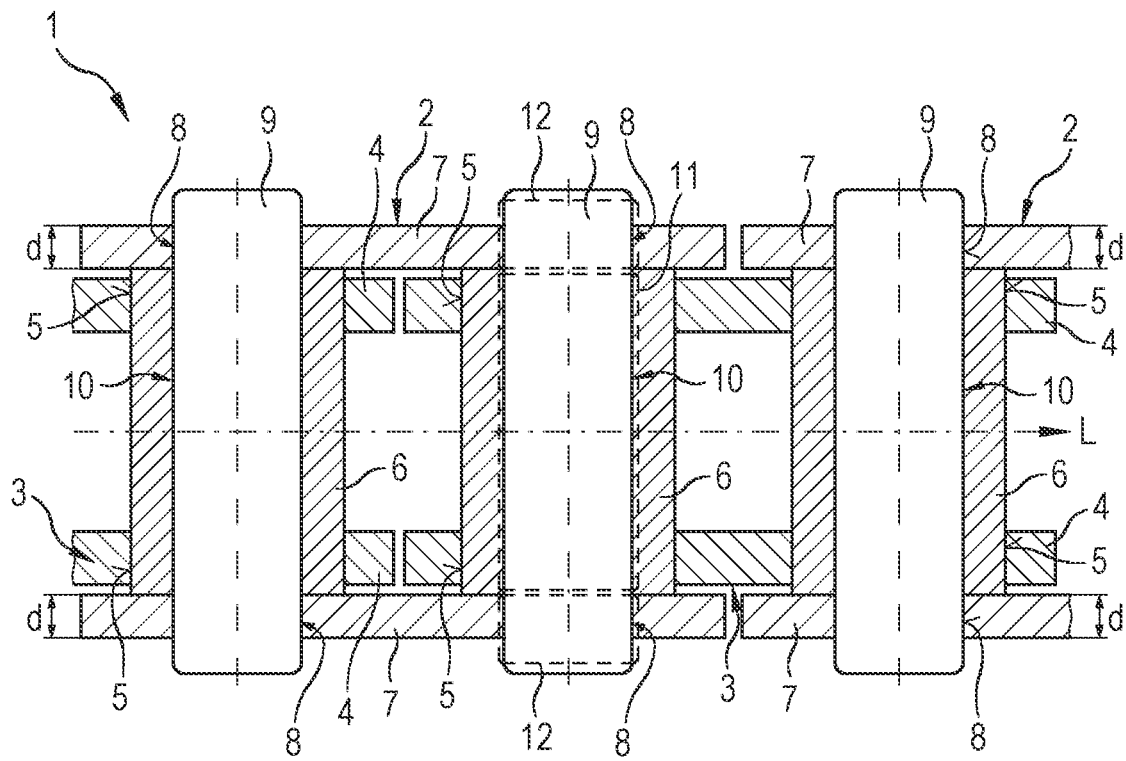
FIG. 1: is a section through a short section of a sprocket chain manufactured according to the chain length control method of the invention.

FIG. 1 shows a section through a short section of a sprocket chain 1 of a chain type in a plane parallel to the longitudinal direction L of the sprocket chain 1. The sprocket chain 1 includes alternately arranged outer chain links 2 and inner chain links 3. Each inner chain link 3 includes two inner link plates 4 arranged at a distance from each other and aligned parallel to the longitudinal direction L of the sprocket chain 1, and two sleeves 6. Each inner link plate 4 has two openings 5. The sleeves 6 are pressed into the openings 5 of each inner link plate 4, with the sleeves 6 holding the inner link plates 4 at a distance from one another.

Each outer chain link 2 includes two outer link plates 7, each with two openings 8. Two pins 9 are pressed into the openings 8 of each outer link plate 7. The pins 9 hold the outer link plates 7 spaced apart from each other. The outer link plates 7 are also aligned parallel to the longitudinal direction L of the sprocket chain 1. The pins 9 of the outer chain links 2 are guided through the sleeves 6 of two adjacent inner chain links 3, thus connecting inner chain links 3 arranged next to each other. The sleeves 6 of the inner chain links 3 and the pins 9 of the outer chain links 2 guided through the sleeves 6 form chain joints 10. The pins 9 of the outer chain links 2 therefore have two different functional areas. These are, on the one hand, a central joint region 11, i.e. the area of the pins 9 which is guided through the sleeves 6 of the inner chain links 3 and together therewith forms the chain joint 10, and two joining regions 12 which adjoin the central joint region 11 at both ends of the pins 9. The pins 9 are pressed into the openings 8 of the outer link plates 7 by means of these joining regions 12.

Figure 2:
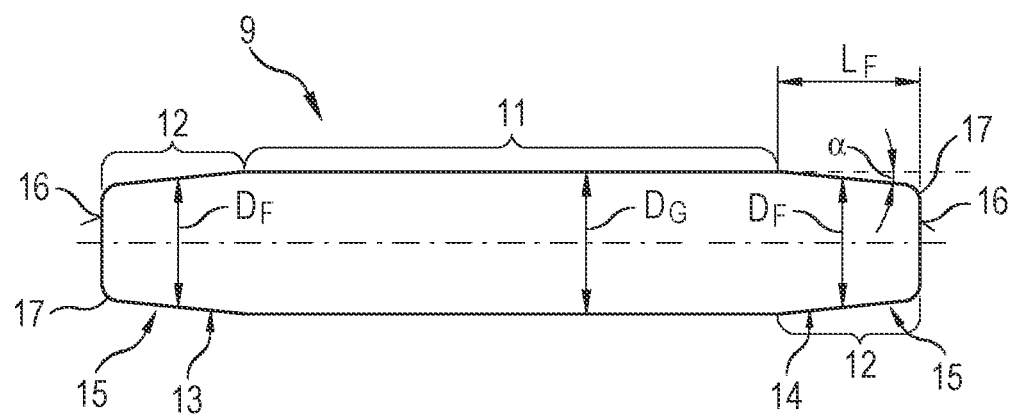
FIG. 2: shows a pin of an outer chain link of the sprocket chain of FIG. 1.

In FIG. 2, there is shown an enlarged view (not to scale) of a pin 9 of the sprocket chain 1 of FIG. 1. The pin 9 has joining regions 12 at each of its ends 13, 14. The joining regions 12 differ in shape from the central joint region 11 of the pin 9. In the joint region 11, the pin 9 is cylindrical in shape and has a constant joint diameter $D_G$. In the embodiment shown in FIG. 2, in the joining regions 12 the pin 9 is conical in shape and has a mean diameter, i.e., the joining diameter $D_F$. The joining diameter $D_F$ is less than the joint diameter $D_G$. Due to the conical shape of the joining regions 12, they are formed as a joining chamfer 15. The joining regions 12 and thus also the joining chamfers 15 at both ends 13, 14 of the pin 6 are formed identically to one another. The joining regions 12 are the areas of the pin 6 which, in the fully assembled state of the chain 1, are arranged in the openings 8 of the outer link plates 7. In the present context, a joining chamfer is to be understood as an area of the pin, in which the diameter of the pin decreases so that the assembly of the pins 9 in the respective opening 8 of the outer link plates is facilitated. In the case shown in FIG. 2, the two joining chamfers 15 are formed by a conical taper. Each joining chamfer 15 has a length $L_F$. This length $L_F$ is approximately 0.4 to 2.5 mm, preferably 0.6 to 1.5 mm. The length $L_F$ of the joining chamfer 15 approximately corresponds to the thickness d of the outer link plates 7. The chamfer angle α of the joining chamfers 15 is in a range of approximately 0.3° to 2°, preferably 0.5° to 1°. In the present case, the chamfer angle α is the angle between the extension of the lateral surface $A_G$ of the cylindrical central part of the pin and the lateral surface $A_F$ of the joining chamfers 15. As already described, the lateral surface $A_F$ of the joining chamfers 15 is conical and therefore corresponds essentially to a straight truncated circular cone. The pin 9 has a rounding 17 on its two end faces 16. This rounding 17 has a radius r of approximately 0.4 mm.

The outer surface of the joining chamfer, however, need not be an exact conical surface. It is sufficient if the range of chamfer angles described above is maintained. A progressive or degressive chamfer profile is then also possible.

In further embodiments, the joining regions of the pins may be formed without a joining chamfer and then have a cylindrical shape, for example. It is important that the joint diameter of the joint region of the pins may be changed without changing the joining diameter of the pins. This may be realized, for example, by the joining diameter of the joining regions being different from the joint diameter of the joint region. The joint diameter of the joint region may then be adjusted without changing the joining regions or the joining diameter. Regardless of the joint diameter, the joining regions then always have the same shape, so that the deformation of the outer link plates when the pins are pressed into the outer link plates is always identical and the chain length control is not affected by this.

In FIG. 1, only a short section of the sprocket chain 1 is shown, namely an outer chain link 2 and an inner chain link 3 connected thereto with the respective following outer and inner chain links. The complete sprocket chain of the one chain type includes a certain number of outer chain links 2 and inner chain links 3 and a fixed chain length. In order to precisely set the chain length of the sprocket chain of the specific chain type, a chain length control method is used, which is described in more detail below with reference to FIGS. 1 and 2.

The chain length control is realized by installing pins 9 with different joint diameters $D_G$. Therefore, in order to adjust the chain length of a sprocket chain of one chain type, a pin set including a plurality of pins 9 is provided. As described above, each of these pins 9 has a joint region 11 with a joint diameter $D_G$ and two joining regions 12 with a joining diameter $D_F$. Pins 9 with different joint diameters $D_G$ are included in the pin set. The joining diameter $D_F$ is identical for all pins 9. First, the joint diameter $D_G$ required for the specified chain length of the sprocket chain of the particular chain type is then determined. The corresponding pins 9 with the determined joint diameter $D_G$ are then selected from the pin set. The inner chain links 3 with the sleeves 6 pressed into the inner link plates 4 are provided. The selected pins 9 are guided through the sleeves 6 of the inner chain links 3 so that the joint region 11 of the pins 9 is arranged in the sleeves 6 of the inner chain links. The pins 9 are pressed into the openings 8 of the outer link plates 7.

In this manner, the outer chain links 2 are closed and, thus, the sprocket chain is completed.

LIST OF REFERENCE SIGNS

1 Sprocket chain
2 Outer chain link
3 Inner chain link
4 Inner link plate
5 Opening of the inner link plate
6 Sleeve
7 Outer link plate
8 Outer link plate openings
9 Pin
10 Chain joint
11 Joint region
12 Joining regions
13 End of pin
14 End of pin
15 Joining chamfer
16 End surface of pin
17 Rounding
L Longitudinal direction of sprocket chain
$D_G$ Joint diameter
$D_F$ Joining diameter
$L_F$ Length of joining chamfer
d Thickness of outer link plates
α Chamfering angle
$A_G$ Curved surface area of joint region
$A_F$ Curved surface area of joining chamfer

The invention claimed is:

1. A method for chain length control of a sprocket chain of a chain type comprising alternately arranged inner chain links and outer chain links, wherein the inner chain links are connected to the outer chain links by means of a chain joint, each of the outer chain link having two outer link plates each with two openings and two pins pressed into the openings of the outer link plates, so that the sprocket chain comprises a plurality of pins, the two pins of the outer chain links each have a joint region, in contact with the inner chain links and having a joint diameter ($D_G$), and two joining regions pressed into the openings of the outer link plates and having a joining diameter ($D_F$), comprising the following steps:

providing a pin set comprising a plurality of pins, at least two of the pins from the pin set having different joint diameters ($D_G$) of the joint regions and, for at least one of the pins from the pin set, the joint diameter ($D_G$) of the joint region differing from the joining diameter ($D_F$) of the joining regions, determining the joint diameter ($D_G$) of the joint region of the pins required for a given chain length, selecting the pins with the determined joint diameter ($D_G$) of the joint region from the pin set, and pressing the joining regions of the pins into the openings in the outer link plates and completing the sprocket chain.

2. The method according to claim 1, wherein the joining regions of all pins of the pin set are formed identically and the joint diameter ($D_G$) of the joint regions of the pins is set to the required diameter.

3. The method according to claim 1, wherein the joint diameter ($D_G$) of the joint regions of the pins is greater than or equal to the joining diameter ($D_F$) of the joining regions of the pins.

4. The method according to claim 1, wherein each of the inner chain link comprises two inner link plates arranged at a distance from one another transversely to the longitudinal direction (L) of the sprocket chain, and two sleeves, each of the inner link plate has two openings, into which the sleeves are pressed and the sleeves hold the inner link plates at a distance from one another, and the pins of the outer chain links are guided with their joint regions through the sleeves of two adjacent of inner chain links of the inner chain links.

5. The method according to claim 1, wherein a joining chamfer is formed on the joining regions of the pins.

6. The method according to claim 5, wherein a length ($L_F$) of the joining chamfer is about 0.4 to 2.5 mm.

7. The method according to claim 5, wherein a length ($L_F$) of the joining chamfer corresponds approximately to the thickness (d) of the outer link plates.

8. The method according to claim 5, wherein a chamfer angle (α) of the joining chamfer is approximately 0.3° to 2°.

9. The method according to claim 5, wherein the joining chamfer extends linearly.

10. The method according to claim 5, wherein the joining chamfer extends progressively.

11. The method according to claim 5, wherein the joining chamfer extends degressively.

12. The method according to claim 5, wherein a length ($L_F$) of the joining chamfer is about 0.6 to 1.5 mm.

13. The method according to claim 5, wherein a chamfer angle (α) of the joining chamfer is approximately 0.5° to 1°.

14. A use of a first pin in a method for chain length control of a sprocket chain of a chain type comprising alternately arranged inner chain links and outer chain links, wherein the inner chain links are connected to the outer chain links by means of a chain joint, each of the outer chain links having two outer link plates each with two openings and two pins pressed into the openings of the outer link plates, so that the sprocket chain comprises a plurality of pins, the two pins of the outer chain links each have a joint region, in contact with the inner chain links and having a joint diameter ($D_G$), and two joining regions pressed into the openings of the outer link plates and having a joining diameter ($D_F$), at least two of the pins from the plurality of pins having different joint diameters ($D_G$) of the joint regions and, for at least one of the pins from the plurality of pins, the joint diameter ($D_G$) of the joint region differing from the joining diameter ($D_F$) of the joining regions;

the first pin being pressed into one of the openings of the sprocket chain, wherein the first pin has a joint region with a joint diameter ($D_G$), and joining regions with a joining diameter ($D_F$) adjoining the joint region on two sides, and changing the joint diameter ($D_G$) of the first pin without changing the joining diameter ($D_F$) of the first pin.

15. A pin set for chain length control of a sprocket chain of a chain type, comprising a plurality of pins, each of the pins having a joint region with a joint diameter ($D_G$) and two joining regions with a joining diameter ($D_F$) adjoining the joint region on both sides, wherein at least two of the pins have different joint diameters ($D_G$) and, for at least one of the pins, the joint diameter ($D_F$) differs from the joining diameter ($D_F$).

16. The pin set according to claim 15, wherein the joining diameter ($D_F$) of the joining regions of all pins is designed identically and the joint diameters ($D_G$) of the joint regions of the pins are greater than or equal to the joining diameter ($D_F$) of the joining regions of the pins.

17. The pin set according to claim 15, wherein the pins have a joining chamfer in their joining regions.

* * * * *